United States Patent [19]

Takaya

[11] Patent Number: 4,731,297

[45] Date of Patent: Mar. 15, 1988

[54] LAMINATED COMPONENTS OF OPEN MAGNETIC CIRCUIT TYPE

[75] Inventor: Minoru Takaya, Tokyo, Japan

[73] Assignee: TDK Corporation, Tokyo, Japan

[21] Appl. No.: 767,545

[22] Filed: Aug. 20, 1985

[51] Int. Cl.[4] .............................................. B32B 15/02

[52] U.S. Cl. .................................... 428/553; 428/557; 428/561; 428/562; 428/693; 428/900; 336/232

[58] Field of Search ............... 428/553, 554, 557, 558, 428/561, 562, 692, 693, 900; 333/84; 336/200, 232

[56] References Cited

U.S. PATENT DOCUMENTS

| | | | |
|---|---|---|---|
| 4,322,698 | 3/1982 | Takahashi et al. | 333/184 |
| 4,544,612 | 10/1985 | Ishii et al. | 428/900 X |
| 4,549,532 | 10/1985 | Baermann | 428/900 X |
| 4,623,405 | 11/1986 | Tamai | 428/900 X |

FOREIGN PATENT DOCUMENTS

| | | | |
|---|---|---|---|
| 760177 | 8/1980 | U.S.S.R. | 428/900 |

*Primary Examiner*—Peter A. Nelson
*Attorney, Agent, or Firm*—Seidel, Gonda, Goldhammer & Abbott

[57] ABSTRACT

Laminated components of the open magnetic circuit type including, or incorporating, inductors of the same type are manufactured by alternately superposing a plurality of green magnetic layers and a plurality of fragmentary, green conductor strips, each strip constituting about half a turn of coil in coil-forming conductor patterns, in such a manner that the ends of the conductor strips overlap the ends of adjacent strips whereas the remainders of the adjacent strips are separated by each interposing magnetic layer, the conductor strips being arranged so that they are vertically superposed along the same spiraling loci, sintering the resulting laminate to a solid sintered body, and, before or after the sintering, sectioning the laminate along the spiraling loci into individual components.

9 Claims, 12 Drawing Figures

LAMINATED COMPONENTS OF OPEN MAGNETIC CIRCUIT TYPE

BACKGROUND OF THE INVENTION

This invention relates to laminated components of the open magnetic circuit type.

Antenna coils and other similar components must have open magnetic circuit structures so that they can detect each external electromagnetic field or cause electromagnetic coupling through interlinkage with the field. Inductors of the open magnetic circuit type are made by winding a conductor coil on a ferrite rod or the like of high permeability. The products are large in size and present fabrication problems including complexity of the process. Recently, inductors that depend on the lamination technique for the fabrication have come to notice in the art. The laminated inductors are built up, for instance, by superposing, by turns, magnetic layers of ferrite powder paste and fragmentary coil-forming conductor patterns and then sintering the laminate at elevated temperature. In the laminated inductors of the structure described, the conductor patterns are embedded in the sintered magnetic body and the magnetic circuit involved is virtually closed. Then, it may appear possible to convert it into an open magnetic circuit by providing a nonmagnetic layer of alumina or the like around the superposed magnetic layers, with conductor patterns printed along the border regions between the magnetic and nonmagnetic layers, and thereafter sintering the resulting laminate structure. Attempts for trial fabrication in this way have, however, revealed great complicacy of the process steps and resulted in defects, such as deformations, strains, and cracks, and also ununiformity of quality. This is partly because precise register of the magnetic and nonmagnetic layers is impossible and also because the two material layers shrink differently on sintering.

SUMMARY OF THE INVENTION

It is an object of the present invention to provide laminated components including inductors of the open magnetic circuit type which exhibit excellent characteristics as such.

Another object of the invention is to provide a method of manufacturing laminated components of the character through a simplified fabrication process.

The laminated components according to the invention are inductors of the open magnetic circuit type themselves (e.g., antenna coils) or the components incorporating such inductors (e.g., ordinary transformers, induced filters, intermediate frequency transformers, or hybrid integrated circuits). These inductors of the open magnetic circuit type are made by sintering alternate laminates of a plurality of magnetic layers and fragmentary coil-forming conductor patterns extending along the outermost edges of the individual magnetic layers. The outer peripheral edges of the conductor patterns are exposed from between the magnetic layers to the outside and, where necessary, they are protected with a resin layer. With this structure the inductors are of a completely open magnetic circuit type and can function excellently in such applications as antennas and transformers.

The method according to the invention, is for the manufacture of inductors of the open magnetic circuit type or laminated components incorporating such inductors, which comprises alternately superposing a plurality of green magnetic layers and a plurality of fragmentary, green conductor strips, each constituting about half a turn of a coil in coil-forming conductor patterns, the conductor strips being formed on the individual magnetic layers in such a manner that they are vertically superposed along the same spiraling loci, with the ends of adjacent conductor strips being overlapped and joined together, and sectioning the laminate, before or after sintering, along the spiraling loci into unit components, thereby exposing the outer peripheries of the conductor strips to the outside, and, where necessary, covering the exposed strip portions with a resin. By the present method inductors of the open magnetic circuit type or laminated components incorporating such inductors can be manufactured with ease.

DETAILED DESCRIPTION OF THE INVENTION

Referring to the accompanying drawing, there are illustrated laminated components of the open magnetic circuit type and a method of manufacturing the same in accordance with the present invention. The invention is shown as embodied in the fabrication of laminated inductors, which may be directly used as antenna coils, for example. However, the following description of the embodiment is for illustrative purposes only, and it is to be understood that the invention may, of course, be applied as well to various laminated components of the open magnetic circuit type as mentioned already.

FIGS. 1 through 12 illustrate a method of simultaneously manufacturing four laminated inductors of the open magnetic circuit type. It should be obvious that the method is applicable to the simultaneous fabrication of larger numbers of products.

Figure 1:
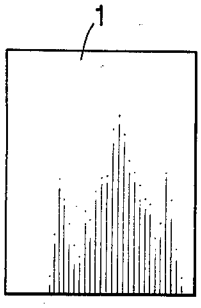
FIGS. 1 through 10 are plan views illustrating the sequence of steps according to the method of the invention.
Figure 2:
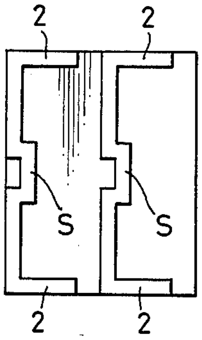
Figure 3:
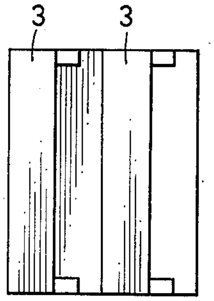
Figure 4:
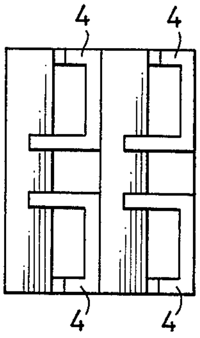
Figure 5:
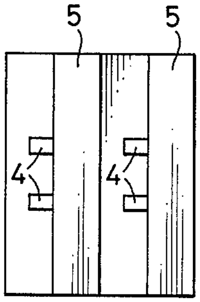
Figure 6:
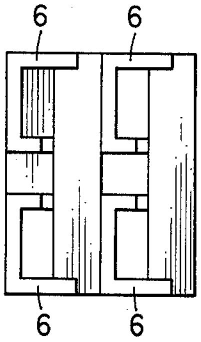
Figure 7:
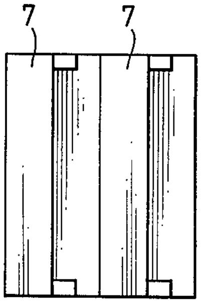
Figure 8:
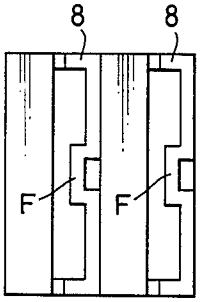
Figure 9:
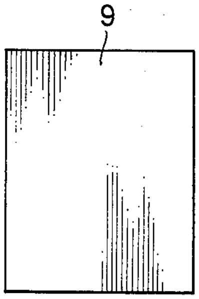

First, as shown in FIG. 1, a green, rectangular magnetic layer 1 of an electrically insulating magnetic material, usually composed of a sheet or layer of ferrite powder paste, is provided. In the embodiment being described, this and subsequent layers are all formed by the printing technique. Next, as FIG. 2 shows, two strips of conductor with legs 2, 2, 2, 2, composed of metal powder paste of Ag, Al, Cu, Ag-Pd, Pd or the like, are formed by printing. These conductor strips extend from their starting ends S, S on the magnetic layer 1 leftwardly, longitudinally, and then laterally along the upper and lower edges of the underlying layer. As in FIG. 3, magnetic layers 3, 3 are printed so that only the ends of the conductor legs 2, 2 are left uncovered. Then, as shown in FIG. 4, conductor strips 4, 4, so shaped as to constitute substantially a half turn of a coil each, are printed to overlap the legs 2, 2 as extensions therefrom. The conductor strips 4,4 are deposited in a symmetrical arrangement. The fabrication proceeds to the step of FIG. 5 where magnetic layers 5, 5 are printed, leaving only the conductor strip ends 4, 4, 4, 4 exposed. Then, as in FIG. 6, conductor strips 6, 6, 6, 6 are printed so as to overlap partly the strips 4, 4, 4, 4. Likewise, magnetic layers 7, 7 as shown in FIG. 7 and conductor strips 8, 8, 8, 8 as in FIG. 8 are formed in succession. The center portions where the conductor strips in pairs meet constitute finish ends F, F. Finally, as indicated in FIG. 9 a magnetic layer 9 is printed over the entire front surface to conclude the lamination process. The laminate is sectioned, as in FIG. 10, into four distinct pieces by removing the border portions 10 by means of a cutter having a cutting breadth J. The pieces are fired at a high temperature in a furnace to obtain sintered bodies, one of which being shown in FIG. 11. When necessary, the peripheral edge faces are polished. Then, as in FIG. 12, external terminals 11, 11 of conductive paste are superposed and baked upon the start end S and the finish end F to complete an inductor.

Each inductor thus completed has its conductor strips exposed along the peripheral edge faces. Altogether, it should be clear that the strips are joined into a single conductor in a vertically spiraling pattern, constituting a coil. This means that the product is a laminated inductor of the open magnetic circuit type.

According to the method of the invention laminated inductors of the open magnetic circuit type can be easily provided by alternately laminating conductor strips, each constituting about half a turn of coil, and magnetic layers and sectioning the resulting laminate along given cutting lines into individual inductors.

The inductors of the invention, with a complete open magnetic circuit structure, may be used with excellent functions in varied applications as elements including antenna coils.

Figure 10:
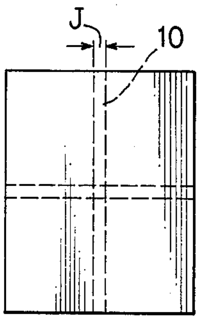
Figure 11:
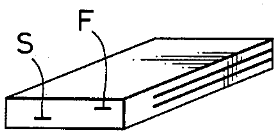
FIG. 11 is a perspective view of a laminate at the point the lamination has been concluded.
Figure 12:
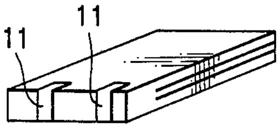
FIG. 12 is a perspective view of a complete laminated inductor of the open magnetic circuit type.

Sectioning, described as a pre-sintering step in connection with FIG. 10, may be effected instead after the sintering of the laminate. Also, it is possible to carry out the steps exemplified above concurrently with the fabrication of some other elements, e.g., building up of laminated capacitors, to manufacture electronic components each incorporating a laminated inductor of the open magnetic circuit type.

It is further possible to coat the whole or part of the edge faces of the laminate to protect the exposed conductor patterns.

What is claimed is:

1. Laminated components of the open magnetic circuit type including, or incorporating, inductors of the same type, each of which comprises a plurality of magnetic layers and a plurality of fragmentary conductor strips formed along the outermost edges of the magnetic layers to constitute about half a turn of coil each, said conductor strips being joined between and across the magnetic layers to form altogether a spiral coil-forming conductor pattern in which the strips are vertically superposed and connected on the same spiraling loci, the outermost peripheries of the conductor pattern being exposed from between the magnetic layers to the outside.

2. An open magnetic circuit type, laminated component comprises:

- a plurality of magnetic layers;
- a plurality of conductor strips, said strips being interconnected thereby defining a coil, said layers being interposed between said strips, each said strip being placed at an outermost edge portion of said layers.

3. The laminated component according to claim 2 wherein said component being an inductor.

4. The laminated component according to claim 2 wherein each said strip defines about half a turn of said coil.

5. The laminated component according to claim 2 wherein an outermost periphery of said coil formed by said plurality of strips being exposed from between said plurality of magnetic layers.

6. The laminated component according to claim 2 wherein said plurality of conductor strips comprise a metal powder paste selected from the group consisting of silver, aluminum, copper, silver-palladium, and palladium.

7. The laminated component according to claim 2 wherein said plurality of magnetic layers comprise a ferrite powder paste.

8. The laminated component according to claim 2 comprising external terminals being connected to said conductor strips and formed of a conductive paste.

9. The laminated component according to claim 2 wherein said component being a sintered body.

* * * * *